United States Patent
Vaidyanathan et al.

(10) Patent No.: US 7,925,873 B2
(45) Date of Patent: Apr. 12, 2011

(54) METHOD AND APPARATUS FOR CONTROLLING OPERATING PARAMETERS IN A COMPUTER SYSTEM

(75) Inventors: Kalyanaraman Vaidyanathan, San Diego, CA (US); Kenny C. Gross, San Diego, CA (US); Ramakrishna C. Dhanekula, San Diego, CA (US)

(73) Assignee: Oracle America, Inc., Redwood Shores, CA (US)

( * ) Notice: Subject to any disclaimer, the term of this patent is extended or adjusted under 35 U.S.C. 154(b) by 850 days.

(21) Appl. No.: 12/048,115

(22) Filed: Mar. 13, 2008

(65) Prior Publication Data

US 2009/0235062 A1 Sep. 17, 2009

(51) Int. Cl.
*G06F 9/00* (2006.01)
*G01R 21/00* (2006.01)
*G21C 17/00* (2006.01)
(52) U.S. Cl. ............................... 713/1; 702/60; 702/182
(58) Field of Classification Search ........................ 713/1
See application file for complete search history.

(56) References Cited

U.S. PATENT DOCUMENTS

| 5,032,780 | A | * | 7/1991 | Hopkins ........................ 318/696 |
| 5,945,988 | A | * | 8/1999 | Williams et al. ............... 715/747 |
| 7,266,371 | B1 | * | 9/2007 | Amin et al. .................... 455/419 |
| 7,756,652 | B2 | * | 7/2010 | Lewis et al. ..................... 702/60 |
| 7,769,562 | B2 | * | 8/2010 | Vaidyanathan et al. ....... 702/183 |
| 2004/0078723 | A1 | * | 4/2004 | Gross et al. ..................... 714/47 |

\* cited by examiner

*Primary Examiner* — Suresh K Suryawanshi
(74) *Attorney, Agent, or Firm* — Park, Vaughan, Fleming & Dowler LLP

(57) ABSTRACT

A system that controls one or more operating parameters in a computer system is presented. Until specified values for one or more operating parameters are achieved, the system performs the following operations. The system operates the computer system using a specified load profile. The system then determines whether the specified load profile produces the specified values for the one or more operating parameters. If the specified load profile does not produce the specified values for the one or more operating parameters, the system adjusts the specified load profile, which involves using a pulse-width modulation technique to adjust a duty cycle between a first workload and a second workload.

25 Claims, 8 Drawing Sheets

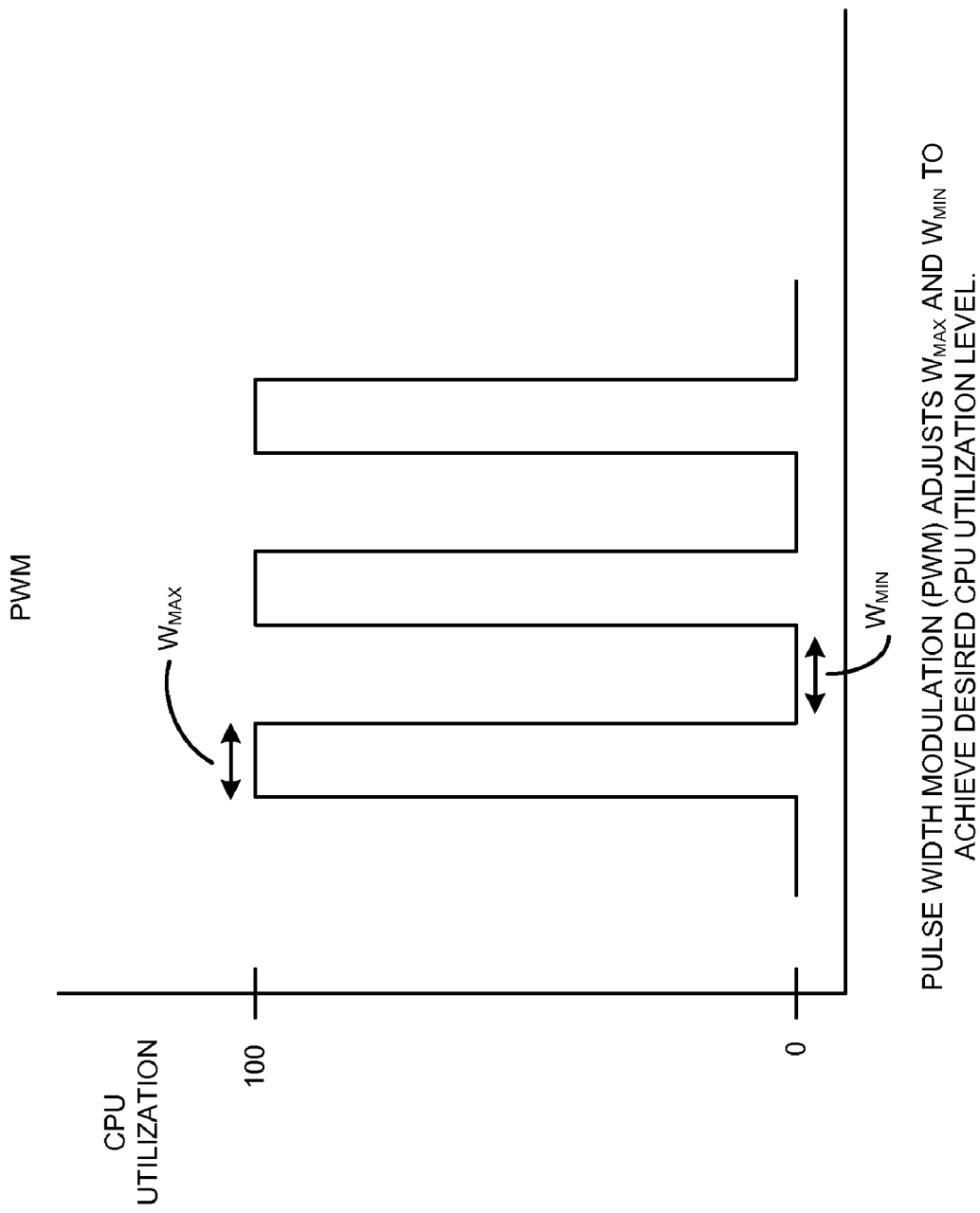

METHOD AND APPARATUS FOR CONTROLLING OPERATING PARAMETERS IN A COMPUTER SYSTEM

BACKGROUND

1. Field of the Invention

The present invention relates to techniques for controlling operating parameters, such as power consumption, in a computer system.

2. Related Art

As energy costs increase, the power consumed by a computer system is becoming an important factor in calculating the total cost-of-ownership of the computer system. Manufacturers of computer systems typically include a power-consumption rating for computer systems. Unfortunately, manufacturers typically report the peak power consumption of computer systems, whereas most computer systems typically operate at utilization rates substantially less than a 100% utilization level.

One solution to this problem is to generate a power-consumption-versus-utilization plot for a computer system which indicates the power consumption at a given utilization level. Unfortunately, when a workload is started on a computer system, the computer system typically devotes substantially all of its resources to complete the workload. When the workload is completed, the utilization of resources within the computer system returns to a substantially minimal level (e.g., idle load). There is no existing technique which effectively generates a workload which can be set at a specified utilization level (e.g., 15% CPU utilization) for a given time period.

SUMMARY

Some embodiments of the present invention provide a system that controls one or more operating parameters in a computer system. Until specified values for one or more operating parameters are achieved, the system performs the following operations. The system operates the computer system using a specified load profile. The system then determines whether the specified load profile produces the specified values for the one or more operating parameters. If the specified load profile does not produce the specified values for the one or more operating parameters, the system adjusts the specified load profile, which involves using a pulse-width-modulation technique to adjust a duty cycle between a first workload and a second workload.

In some embodiments, prior to operating the computer system using the specified load profile, the system generates the specified load profile.

In some embodiments, the specified load profile cycles between the first workload which produces a first resource-utilization level and the second workload which produces a second resource-utilization level, wherein the first resource-utilization level is greater than the second resource-utilization level.

In some embodiments, the first resource-utilization level uses substantially all of the resources on the computer system.

In some embodiments, the second resource-utilization level uses substantially none of the resources on the computer system.

In some embodiments, the first workload is executed for a first time period within a given cycle and the second workload is executed for a second time period within the given cycle.

In some embodiments, if the specified load profile produces values for the one or more operating parameters which are below the specified values for the one or more operating parameters, while adjusting the specified load profile, the system increases the first time period and decreases the second time period for the given cycle of the specified load profile.

In some embodiments, if the specified load profile produces values for the one or more operating parameters that are above the specified values for the one or more operating parameters, while adjusting the specified load profile, the system decreases the first time period and increases the second time period for the given cycle of the specified load profile.

In some embodiments, the one or more operating parameters include one or more of: a resource-utilization level; a temperature; and a power-consumption level.

In some embodiments, the one or more operating parameters include a specified resource-utilization level. If the specified load profile produces the specified resource-utilization level, the system determines the power consumed by the computer system at the specified resource-utilization level.

In some embodiments, the specified resource-utilization level includes a utilization level of one or more of: throughput; transaction latencies; queue lengths; central processing unit (CPU) load; memory load; cache load; I/O traffic; bus saturation metrics; FIFO overflow statistics; and disk-related metrics.

In some embodiments, the one or more operating parameters include a power-consumption level. If the specified load profile produces the specified power-consumption level, the system analyzes the performance of the computer system while the computer system is operating at the specified power-consumption level.

BRIEF DESCRIPTION OF THE FIGURES

FIG. 2 presents an exemplary graph of a pulse-width modulation (PWM) technique used to adjust load profiles in a computer system in accordance with an embodiment of the present invention.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description can be embodied as code, data structures, and/or data, which can be stored on a computer-readable storage medium as described above. When a computer system reads and executes the code and/or data stored on the computer-readable storage medium, the computer system performs the methods and processes embodied as code, data structures, and/or data that are stored within the computer-readable storage medium. Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Computer System

Figure 1A:
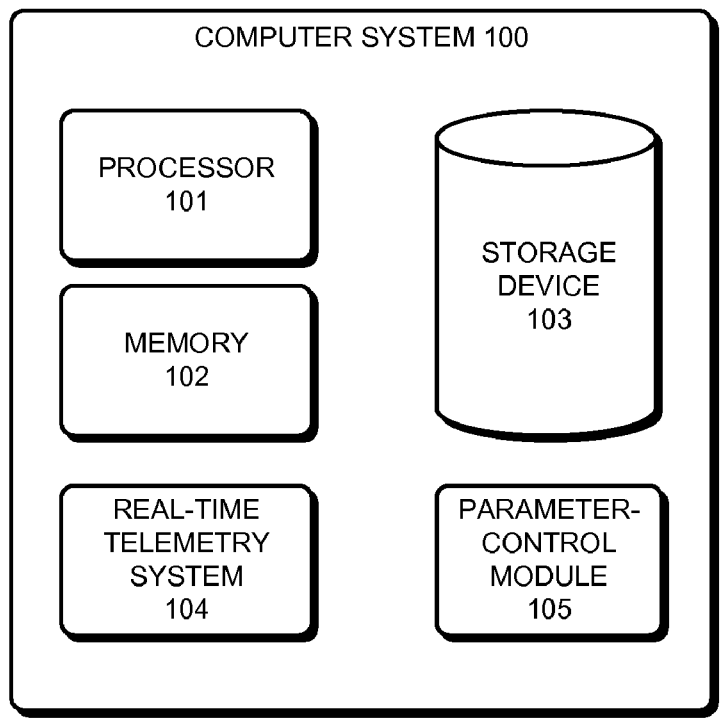
FIG. 1A presents a block diagram illustrating a computer system in accordance with an embodiment of the present invention.

FIG. 1A presents a block diagram illustrating a computer system 100 in accordance with an embodiment of the present invention. Computer system 100 includes one or more of processor 101, memory 102, storage device 103, real-time telemetry system 104, and parameter-control module 105.

Processor 101 can generally include any type of processor, including, but not limited to, a microprocessor, a mainframe computer, a digital signal processor, a personal organizer, a device controller and a computational engine within an appliance. Memory 102 can include any type of memory, including but not limited to, dynamic random access memory (DRAM), static random access memory (SRAM), flash memory, read only memory (ROM), and any other type of memory now known or later developed. Storage device 103 can include any type of non-volatile storage device that can be coupled to a computer system. This includes, but is not limited to, magnetic, optical, and magneto-optical storage devices, as well as storage devices based on flash memory and/or battery-backed up memory.

In some embodiments of the present invention, real-time telemetry system 104 is separate from computer system 100. Note that real-time telemetry system 104 is described in more detail below with reference to FIG. 8.

In some embodiments of the present invention, parameter-control module 105 is separate from computer system 100. Note that parameter-control module 105 is described in more detail below with reference to FIG. 1B. In some embodiments, parameter-control module 105 is included in real-time telemetry system 104.

Figure 1B:
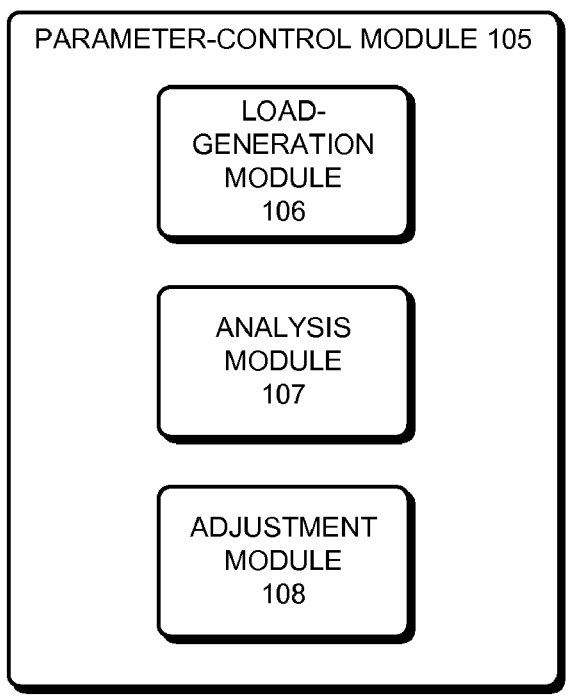
FIG. 1B presents a block diagram of a parameter-control module in accordance with an embodiment of the present invention.

FIG. 1B presents a block diagram of parameter-control module 105 in accordance with an embodiment of the present invention. Parameter-control module 105 includes load-generation module 106, analysis module 107, and adjustment module 108. Load-generation module 106 is configured to operate the computer system using a specified load profile. Analysis module 107 is configured to determine whether the specified load profile produces the specified values for the one or more operating parameters. Adjustment module 108 is configured to adjust the specified load profile if the specified load profile does not produce the specified values for the one or more operating parameters. In some embodiments, load-generation module 106, analysis module 107, and adjustment module 108 are configured to be operated until specified values for one or more operating parameters are achieved.

In some embodiments, one or more of load-generation module 106, analysis module 107, and adjustment module 108 are included in one or more integrated circuit (IC) chips. For example, these IC chips can include, but are not limited to, application-specific integrated circuit (ASIC) chips, field-programmable gate arrays (FPGAs), and other programmable-logic devices now known or later developed.

Overview

In some embodiments of the present invention, a pulse-width modulation (PWM) technique is used to generate a specified resource-utilization level. For example, these embodiments can be used to generate a specified central processing unit (CPU) utilization level (e.g., 15% CPU utilization) for a specified time period.

In some embodiments, the PWM technique uses a load profile that generates two resource-utilization levels that produce a square waveform. The duty cycle of the square waveform can be modulated so that the average value of the resource-utilization levels generated by the load profile produces a specified resource-utilization level. In other embodiments, the PWM technique uses a load profile that generates resource-utilization levels that produce one or more of: a sinusoidal waveform; a saw-toothed waveform; and other specified periodic waveforms. In these embodiments, the average value of the resource-utilization levels generated by the waveforms produces a specified resource-utilization level.

In some embodiments, the square waveform resource-utilization levels include a maximum utilization level and a minimum utilization level. In other embodiments, the resource-utilization waveform generated by the load profile includes a plurality of utilization levels used to generate the specified resource-utilization level.

In some embodiments, a workload that utilizes substantially all of the resources within the computer system is used to generate the maximum resource-utilization level (e.g., $W_{max}$ in FIG. 2). In some embodiments, a state when the computer system is substantially idle is used to generate the minimum resource-utilization level (e.g., $W_{min}$ in FIG. 2). Hence, in some embodiments, the maximum and minimum states of PWM load profile correspond to "stop" and "run" states of the workload. Note that the stop state typically produces a substantially minimum power-consumption state, and the run state typically produces a substantially maximum power consumption state. By modulating the width of the stop and run states, a specified resource-utilization level can be obtained. For example, FIG. 2 presents an exemplary graph of a PWM technique used to adjust CPU utilization in a computer system in accordance with an embodiment of the present invention.

In some embodiments, a "freeze/unfreeze" technique is used to generate the load profile for the stop and run states. In the freeze state, a load profile is loaded in memory and is ready to be executed but remains suspended. In the unfreeze state (i.e., run state), the computer system is sent a signal to resume execution of the "frozen" load profile. Using the "freeze/unfreeze" technique eliminates the overhead involved with stopping and restarting the workload.

In some embodiments, once a desired resource-utilization level is achieved, the desired resource-utilization level is maintained for a specified time. Furthermore, one or more specified actions can be performed. For example, power and/or temperature measurements can be obtained. Similarly, the performance of the computer system can be obtained. Note that diagnostic and failure analyses can also be performed.

Controlling Operating Parameters in a Computer System

Figure 3:
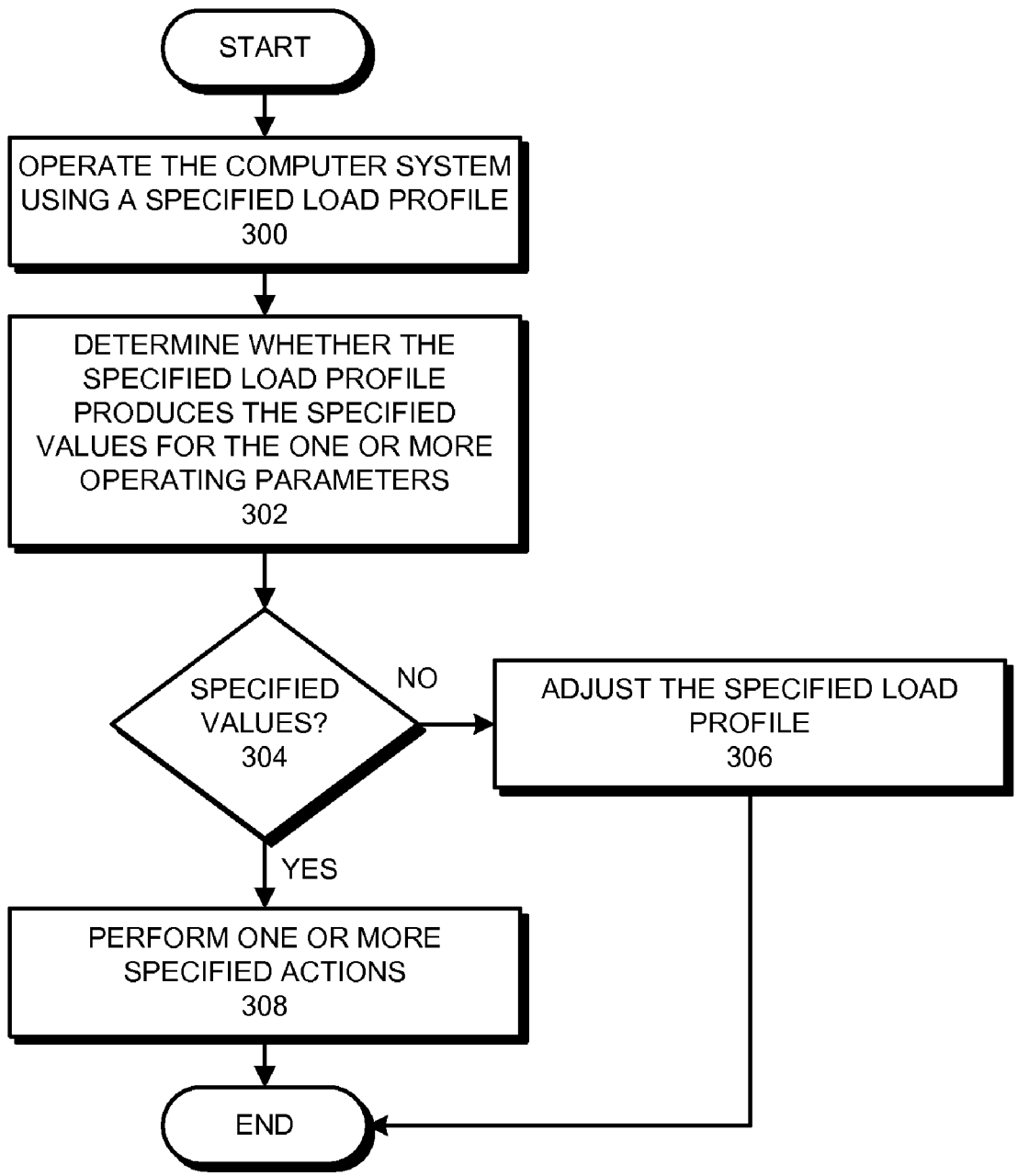
FIG. 3 presents a flow chart illustrating a process for controlling one or more operating parameters in a computer system in accordance with an embodiment of the present invention.

FIG. 3 presents a flow chart illustrating a process for controlling one or more operating parameters in a computer system in accordance with an embodiment of the present invention. The system performs the following operations until specified values for one or more operating parameters are achieved. The system operates the computer system using a specified load profile (step 300). The system then determines whether the specified load profile produces the specified values for the one or more operating parameters (step 302). If the specified load profile does not produce the specified values for the one or more operating parameters (step 304, no), the system adjusts the specified load profile (step 306). In some embodiments, while adjusting the specified load profile, the system uses a pulse-width modulation technique to adjust a duty cycle between a first workload and a second workload. If the specified load profile produces the specified values for the one or more operating parameters (step 304, yes), the system performs one or more specified actions (step 308).

In some embodiments, the one or more operating parameters include one or more of: a resource-utilization level; a temperature; and a power-consumption level. Note that other operating parameters can be controlled. For example, the operating parameters and inferential variables described in reference to real-time telemetry system 104 can be controlled.

In some embodiments, the one or more operating parameters are monitored using real-time telemetry system 104.

In some embodiments, the one or more operating parameters include the specified resource-utilization level and the one or more specified actions include determining the power consumed by the computer system at the specified resource-utilization level. In some embodiments, the specified resource-utilization level includes a utilization level of one or more of: throughput; transaction latencies; queue lengths; central processing unit (CPU) load; memory load; cache load; I/O traffic; bus saturation metrics; FIFO overflow statistics; and disk-related metrics.

In some embodiments, the one or more operating parameters include a power-consumption level and the one or more specified actions include analyzing the performance of the computer system while the computer system is operating at the specified power-consumption level.

In some embodiments, the one or more operating parameters include a temperature and the one or more specified actions include analyzing the performance of the computer system while the computer system is operating at the specified temperature. For example, the CPU temperature can be maintained at a specified temperature using this technique. These embodiments can be used to diagnose a failing component within the computer system which exhibits anomalies that can only be reproduced when the component is operated at a specified temperature.

In some embodiments, prior to operating the computer system using the specified load profile, the system generates the specified load profile.

In some embodiments, the specified load profile cycles between a first workload which produces a first resource-utilization level and a second workload which produces a second resource-utilization level, wherein the first resource-utilization level is greater than the second resource-utilization level. For example, the system cycles between $W_{max}$ and $W_{min}$ in FIG. 2.

In some embodiments, the first resource-utilization level uses substantially all of the resources on the computer system (e.g., a run state). In some embodiments, the second resource-utilization level uses substantially none of the resources on the computer system (e.g., an idle state).

In some embodiments, the first workload is executed for a first time period within a given cycle and the second workload is executed for a second time period within the given cycle.

In some embodiments, if the specified load profile produces values for the one or more operating parameters that are below the specified values for the one or more operating parameters, the system increases the first time period and decreases the second time period for the given cycle of the specified load profile.

In some embodiments, if the specified load profile produces values for the one or more operating parameters which are above the specified values for the one or more operating parameters, the system decreases the first time period and increases the second time period for the given cycle of the specified load profile.

Exemplary Implementation

Figure 4:
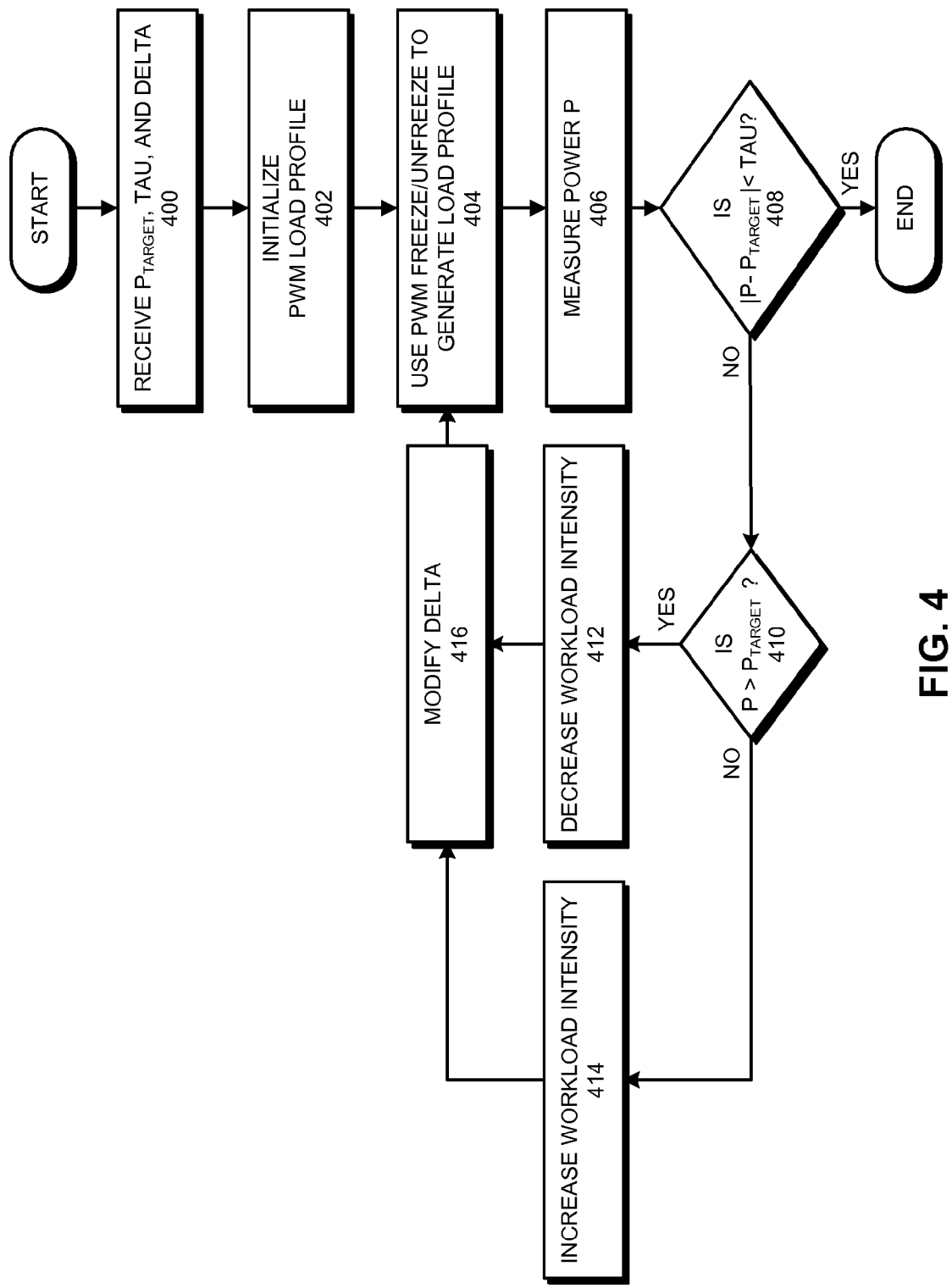
FIG. 4 presents a flow chart illustrating an exemplary process for controlling power consumption in a computer system in accordance with an embodiment of the present invention.

FIG. 4 presents a flow chart illustrating an exemplary process for controlling power-consumption in a computer system in accordance with an embodiment of the present invention. The process begins when the system receives a target power-consumption level ($P_{target}$), a tolerance (tau), and an adjustment value (delta) (step 400). Next the system initializes the attributes for the PWM load profile (step 402). For example, for a PWM load profile with a period of T, the pulse width of the maximum utilization level (i.e., $W_{max}$) is set to T/2. Furthermore, delta can be set to T/4.

Next, the system uses a freeze/unfreeze technique to generate a load profile (step 404) which is executed on the computer system. The system then measures the power consumption P (step 406). In some embodiments, P is measured using real-time telemetry system 104. In other embodiments, an external power monitor is used to measure P.

If $|P-P_{target}|<$tau (step 408, yes), the process illustrated in FIG. 4 ends. Note that once $P_{target}$ has been reached, other specified actions can be performed as described above. Otherwise (step 408, no), if $P>P_{target}$ (step 410, yes), the system decreases the workload intensity (step 412). For example, the system can set $W_{max}=W_{max}$–delta. If $P<P_{target}$ (step 410, no), the system increases the workload intensity (step 414). For example, the system can set $W_{max}=W_{max}$+delta.

After steps 412 or 416, the system modifies delta (step 416). For example, the system sets delta=delta/2. The system then returns to step 404.

Figure 5:
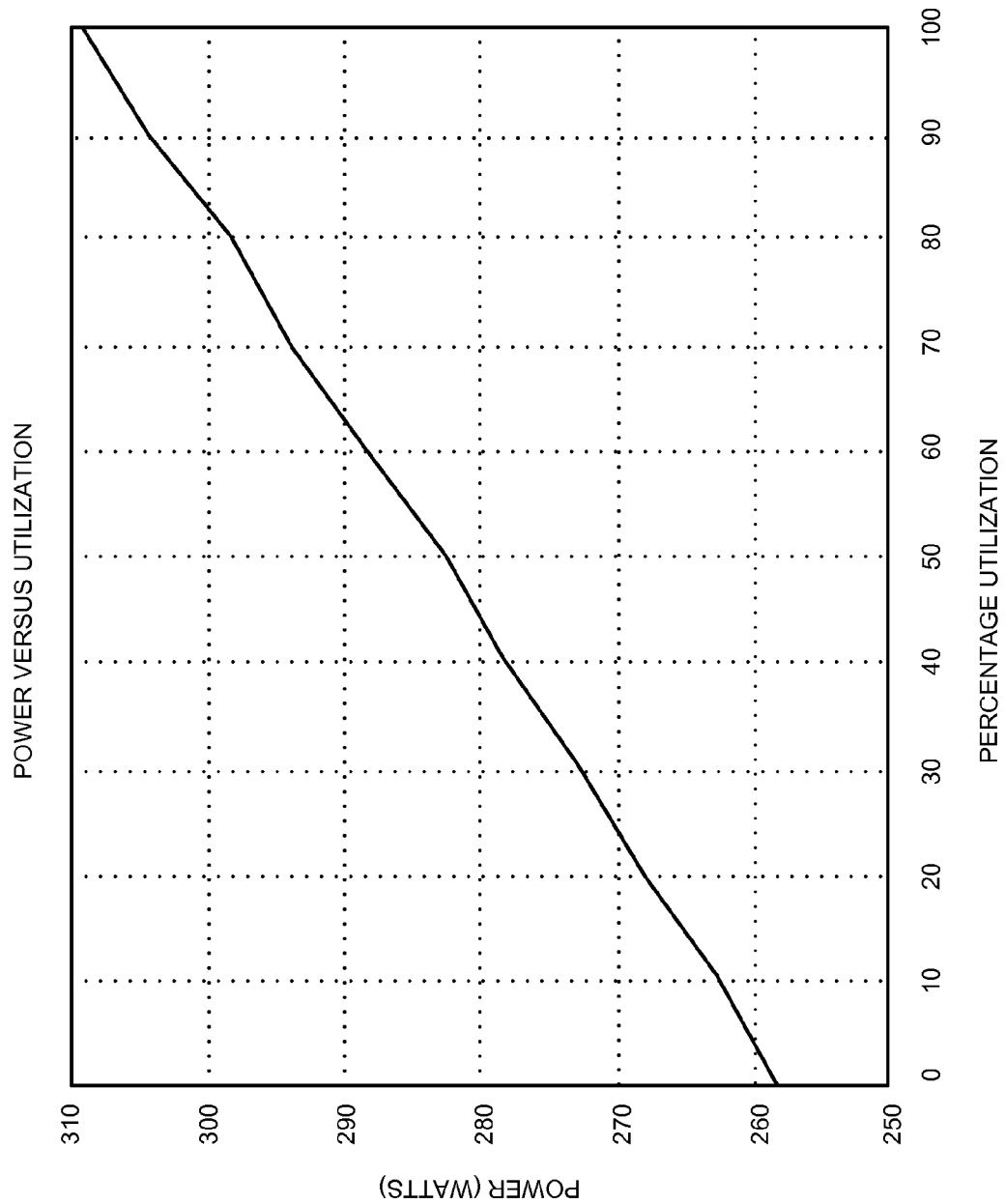
FIG. 5 presents an exemplary power-versus-utilization graph for a computer system in accordance with an embodiment of the present invention.
Figure 6:
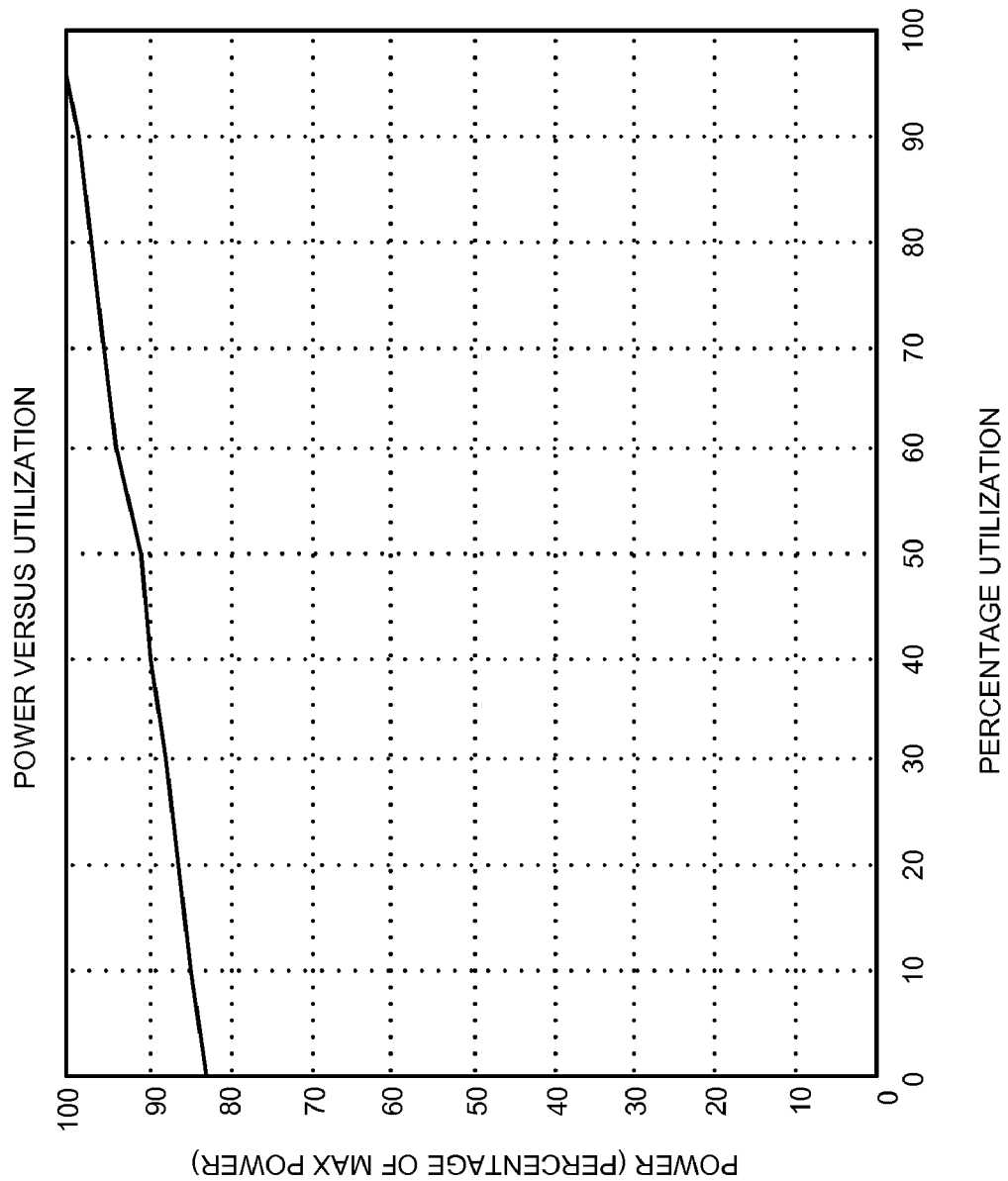
FIG. 6 presents another exemplary power-versus-utilization graph for a computer system in accordance with an embodiment of the present invention.
Figure 7:
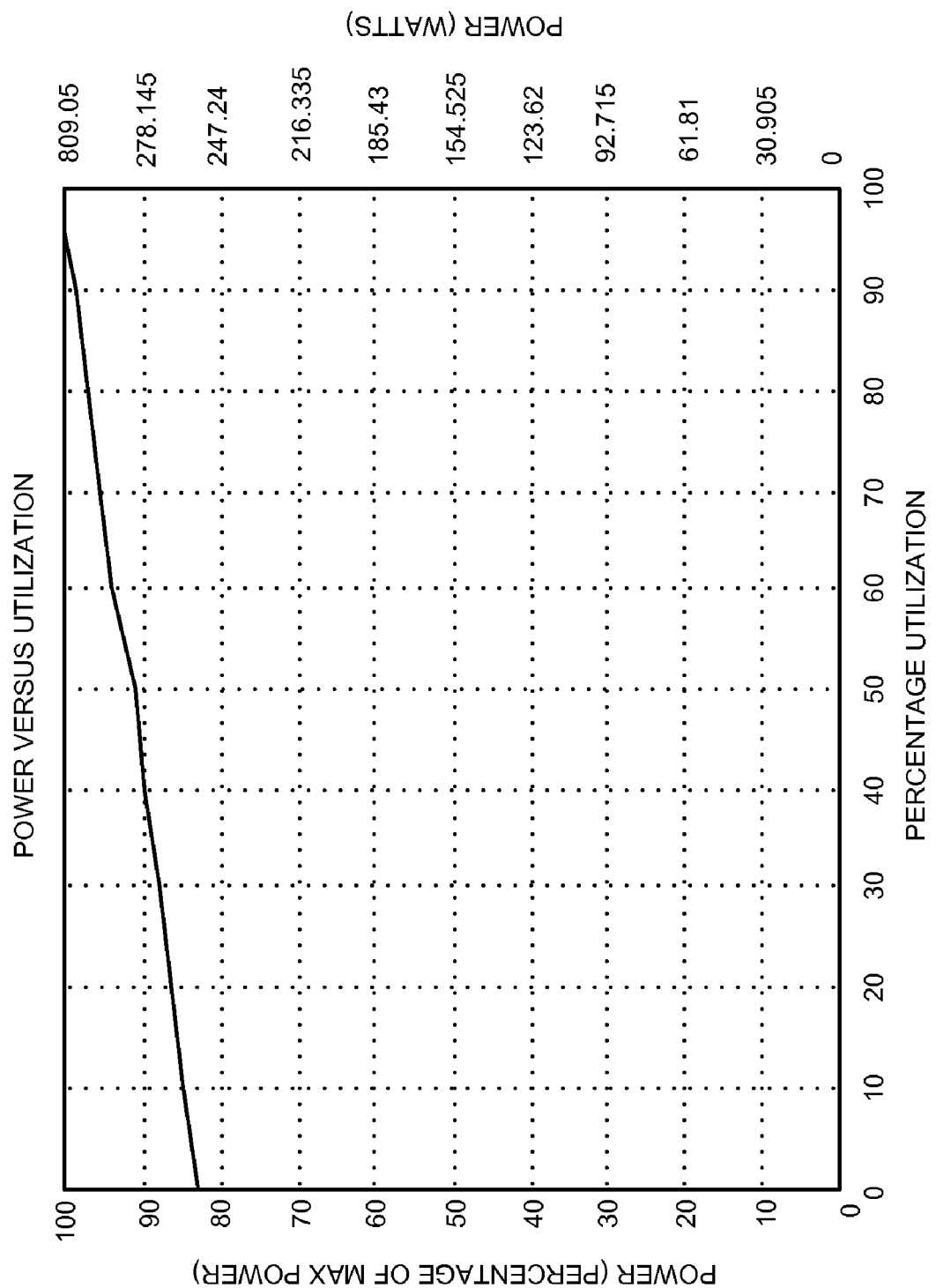
FIG. 7 presents another exemplary power-versus-utilization graph for a computer system in accordance with an embodiment of the present invention.

FIGS. 5-7 present exemplary power-versus-utilization graphs for a number of computer systems in accordance with an embodiment of the present invention. These graphs illustrate power-consumption measurements which were taken at discrete resource utilization points (e.g., 10% CPU utilization, 20% CPU utilization, . . . , etc.) using the PWM technique described above.

Real-Time Telemetry System

Figure 8:
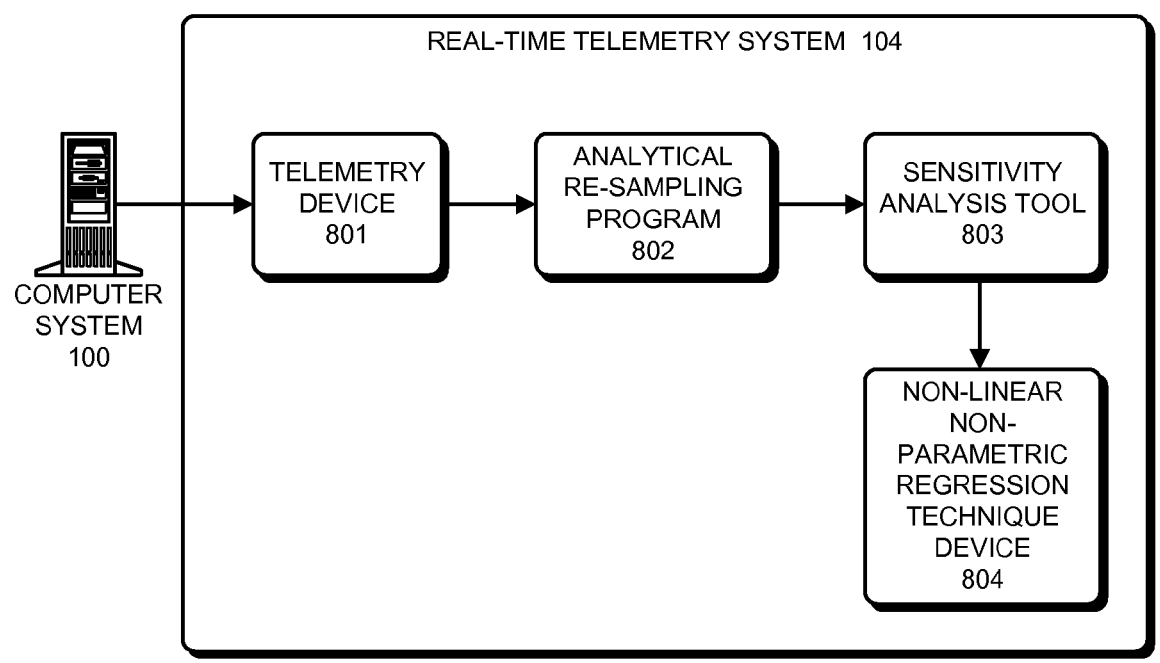
FIG. 8 presents a block diagram of a real-time telemetry system which monitors a computer system in accordance with an embodiment of the present invention.

FIG. 8 presents a block diagram of a real-time telemetry system 104 which monitors computer system 100 in accordance with an embodiment of the present invention. Real-time telemetry system 104 includes telemetry device 801, analytical re-sampling program 802, sensitivity analysis tool 803, and non-linear, non-parametric (NLNP) regression technique device 804. Telemetry device 801 gathers information from the various sensors and monitoring tools within computer system 100, and directs the signals to local or remote locations that include analytical re-sampling program 802, sensitivity analysis tool 803, and NLNP regression technique device 804. In one embodiment of the present invention, analytical re-sampling program 802, sensitivity analysis tool 803, and NLNP regression technique device 804 are located within computer system 100. In another embodiment of the present invention, analytical re-sampling program 802, sensitivity analysis tool 803, and NLNP regression technique device 804 are located on a plurality of computer systems including computer system 100 and other remote computer systems. The analytical re-sampling program 802 ensures that the signals have a uniform sampling rate. In doing so, analytical re-sampling program 802 uses interpolation techniques, if necessary, to fill in missing data points, or to equalize the sampling intervals when the raw data is non-uniformly sampled.

After the signals pass through analytical re-sampling program 802, they are aligned and correlated by sensitivity analysis tool 803. For example, in some embodiments of the present invention, sensitivity analysis tool 803 incorporates a novel moving window technique that "slides" through the signals with systematically varying window widths. The sliding windows systematically vary the alignment between windows for different signals to optimize the degree of association between the signals, as quantified by an "F-statistic," which is computed and ranked for all signal windows by sensitivity analysis tool 803.

For statistically comparing the quality of two fits, F-statistics reveal the measure of regression. The higher the value of the F-statistic, the better the correlation is between two signals. The lead/lag value for the sliding window that results in the F-statistic with the highest value is chosen, and the candidate signal is aligned to maximize this value. This process is repeated for each signal by sensitivity analysis tool 803.

Signals that have an F-statistic very close to 1 are "completely correlated" and can be discarded. This can result when two signals are measuring the same metric, but are expressing them in different engineering units. For example, a signal can convey a temperature in degrees Fahrenheit, while a second signal conveys the same temperature in degrees Centigrade. Since these two signals are perfectly correlated, one does not include any additional information over the other, and therefore, one may be discarded.

Some signals may exhibit little correlation, or no correlation whatsoever. In this case, these signals may be dropped as they add little predictive value. Once a highly correlated subset of the signals has been determined, they are combined into one group or cluster for processing by the NLNP regression technique device 804.

Non-Linear, Non-Parametric Regression

In some embodiments of the present invention, the NLNP regression technique is a multivariate state estimation technique (MSET). The term "MSET" as used in this specification refers to a class of pattern recognition algorithms. For example, see [Gribok] "Use of Kernel Based Techniques for Sensor Validation in Nuclear Power Plants," by Andrei V. Gribok, J. Wesley Hines, and Robert E. Uhrig, *The Third American Nuclear Society International Topical Meeting on Nuclear Plant Instrumentation and Control and Human-Machine Interface Technologies*, Washington D.C., Nov. 13-17, 2000. This paper outlines several different pattern recognition approaches. Hence, the term "MSET" as used in this specification can refer to (among other things) any technique outlined in [Gribok], including Ordinary Least Squares (OLSs), Support Vector Machines (SVMs), Artificial Neural Networks (ANNs), MSET, or Regularized MSET (RMSET).

Some embodiments of the present invention continuously monitor a variety of instrumentation signals in real time during operation of the server. (Note that although we refer to a single computer system in this disclosure, the present invention also applies to a collection of computer systems.)

These instrumentation signals can also include signals associated with internal operating parameters maintained by software within the computer system. For example, these internal operating parameters can include system throughput, transaction latencies, queue lengths, load on the central processing unit, load on the memory, load on the cache, I/O traffic, bus saturation metrics, FIFO overflow statistics, and various operational profiles gathered through "virtual sensors" located within the operating system.

These instrumentation signals can also include signals associated with canary operating parameters for synthetic user transactions, which are periodically generated for the purpose of measuring quality of service from the end user's perspective.

These instrumentation signals can additionally include hardware variables, including, but not limited to, internal temperatures, voltages, currents, and fan speeds.

Furthermore, these instrumentation signals can include disk-related metrics for storage devices such as disk drives, including, but not limited to, average service time, average response time, number of kilobytes (kB) read per second, number of kB written per second, number of read requests per second, number of write requests per second, and number of soft errors per second.

The foregoing instrumentation parameters are monitored continuously with an advanced statistical pattern recognition technique. Some embodiments of the present invention use a class of techniques known as non-linear, non-parametric (NLNP) regression techniques, such as the MSET. Alternatively, some embodiments of the present invention can use other pattern recognition techniques, such as neural networks or other types of NLNP regression. Other embodiments of the present invention use a linear regression technique. In each case, the pattern recognition module "learns" how the behavior of the monitored variables relates to a properly-functioning computer system. The pattern recognition module then generates a model of the properly-functioning computer system that is used to determine whether a computer system is at the onset of degradation.

In some embodiments of the present invention, the system components from which the instrumentation signals originate are field replaceable units (FRUs), which can be independently monitored. Note that all major system units, including both hardware and software, can be decomposed into FRUs. (For example, a software FRU can include: an operating system, a middleware component, a database, or an application.)

Also note that these embodiments of the present invention are not meant to be limited to server computer systems. In general, these embodiments of the present invention can be applied to any type of computer system. This includes, but is not limited to, a computer system based on a microprocessor, a mainframe computer, a digital signal processor, a portable computing device, a personal organizer, a device controller, and a computational engine within an appliance.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for controlling one or more operating parameters in a computer system, comprising:
   until specified values for one or more operating parameters are achieved, performing the following operations:
      operating the computer system using a specified load profile;
      determining whether the specified load profile produces the specified values for the one or more operating parameters; and
      if the specified load profile does not produce the specified values for the one or more operating parameters, adjusting the specified load profile, which involves using a pulse-width modulation technique to adjust a duty cycle between a first workload and a second workload.

2. The method of claim 1, wherein prior to operating the computer system using the specified load profile, the method further comprises generating the specified load profile.

3. The method of claim 1, wherein the specified load profile cycles between the first workload which produces a first resource-utilization level and the second workload which produces a second resource-utilization level, wherein the first resource-utilization level is greater than the second resource-utilization level.

4. The method of claim 3, wherein the first resource-utilization level uses substantially all of the resources on the computer system.

5. The method of claim 3, wherein the second resource-utilization level uses substantially none of the resources on the computer system.

6. The method of claim 3,
   wherein the first workload is executed for a first time period within a given cycle; and
   wherein the second workload is executed for a second time period within the given cycle.

7. The method of claim 6, wherein if the specified load profile produces values for the one or more operating parameters which are below the specified values for the one or more operating parameters, adjusting the specified load profile involves increasing the first time period and decreasing the second time period for the given cycle of the specified load profile.

8. The method of claim 6, wherein if the specified load profile produces values for the one or more operating parameters which are above the specified values for the one or more operating parameters, adjusting the specified load profile involves decreasing the first time period and increasing the second time period for the given cycle of the specified load profile.

9. The method of claim 1, wherein the one or more operating parameters include one or more of:
   a resource-utilization level;
   a temperature; and
   a power-consumption level.

10. The method of claim 1,
    wherein the one or more operating parameters include a specified resource-utilization level; and
    wherein if the specified load profile produces the specified resource-utilization level, the method further comprises determining the power consumed by the computer system at the specified resource-utilization level.

11. The method of claim 10, wherein the specified resource-utilization level includes a utilization level of one or more of:
    throughput;
    transaction latencies;
    queue lengths;
    central processing unit (CPU) load;
    memory load;
    cache load;
    I/O traffic;
    bus saturation metrics;
    FIFO overflow statistics; and
    disk-related metrics.

12. The method of claim 1,
    wherein the one or more operating parameters include a power-consumption level; and
    wherein if the specified load profile produces the specified power-consumption level, the method further comprises analyzing the performance of the computer system while the computer system is operating at the specified power-consumption level.

13. A computer-readable storage medium storing instructions that when executed by a computer cause the computer to perform a method for controlling one or more operating parameters in a computer system, wherein the method comprises:
    until specified values for one or more operating parameters are achieved, performing the following operations:
       operating the computer system using a specified load profile;
       determining whether the specified load profile produces the specified values for the one or more operating parameters; and
       if the specified load profile does not produce the specified values for the one or more operating parameters, adjusting the specified load profile, which involves using a pulse-width modulation technique to adjust a duty cycle between a first workload and a second workload.

14. The computer-readable storage medium of claim 13, wherein prior to operating the computer system using the specified load profile, the method further comprises generating the specified load profile.

15. The computer-readable storage medium of claim 13, wherein the specified load profile cycles between the first workload which produces a first resource-utilization level and the second workload which produces a second resource-utilization level, wherein the first resource-utilization level is greater than the second resource-utilization level.

16. The computer-readable storage medium of claim 15, wherein the first resource-utilization level uses substantially all of the resources on the computer system.

17. The computer-readable storage medium of claim 15, wherein the second resource-utilization level uses substantially none of the resources on the computer system.

18. The computer-readable storage medium of claim 15,
    wherein the first workload is executed for a first time period within a given cycle; and
    wherein the second workload is executed for a second time period within the given cycle.

19. The computer-readable storage medium of claim 18, wherein if the specified load profile produces values for the one or more operating parameters which are below the specified values for the one or more operating parameters, adjusting the specified load profile involves increasing the first time period and decreasing the second time period for the given cycle of the specified load profile.

20. The computer-readable storage medium of claim 18, wherein if the specified load profile produces values for the one or more operating parameters which are above the specified values for the one or more operating parameters, adjusting the specified load profile involves decreasing the first time period and increasing the second time period for the given cycle of the specified load profile.

21. The computer-readable storage medium of claim 13, wherein the one or more operating parameters include one or more of:
a resource-utilization level;
a temperature; and
a power-consumption level.

22. The computer-readable storage medium of claim 13, wherein the one or more operating parameters include a specified resource-utilization level; and
wherein if the specified load profile produces the specified resource-utilization level, the method further comprises determining the power consumed by the computer system at the specified resource-utilization level.

23. The computer-readable storage medium of claim 22, wherein the specified resource-utilization level includes a utilization level of one or more of:
throughput;
transaction latencies;
queue lengths;
central processing unit (CPU) load;
memory load;
cache load;
I/O traffic;
bus saturation metrics;
FIFO overflow statistics; and
disk-related metrics.

24. The computer-readable storage medium of claim 13, wherein the one or more operating parameters include a power-consumption level; and
wherein if the specified load profile produces the specified power-consumption level, the method further comprises analyzing the performance of the computer system while the computer system is operating at the specified power-consumption level.

25. An apparatus that controls one or more operating parameters in a computer system, comprising:
a load-generation mechanism configured to operate the computer system using a specified load profile;
an analysis mechanism configured to determine whether the specified load profile produces the specified values for the one or more operating parameters; and
an adjustment mechanism configured to adjust the specified load profile if the specified load profile does not produce the specified values for the one or more operating parameters, wherein while adjusting the specified load profile, the adjustment mechanism is configured to use a pulse-width modulation technique to adjust a duty cycle between a first workload and a second workload;
wherein the load-generation mechanism, the analysis mechanism, and the adjustment mechanism are configured to be operated until specified values for one or more operating parameters are achieved.

* * * * *